Oct. 26, 1926.  1,604,320
L. SAIVES
OPERATING DEVICE FOR THE BRAKING OF MOTOR DRIVEN VEHICLES
Filed May 31, 1923

INVENTOR
Leon Saives
By Chas. J. Hull
ATTORNEY

Patented Oct. 26, 1926.

1,604,320

UNITED STATES PATENT OFFICE.

LÉON SAIVES, OF BILLANCOURT, FRANCE, ASSIGNOR TO LOUIS RENAULT, OF BILLANCOURT, FRANCE.

OPERATING DEVICE FOR THE BRAKING OF MOTOR-DRIVEN VEHICLES.

Application filed May 31, 1923, Serial No. 642,617, and in France May 3, 1922.

The invention relates to braking devices for motor vehicles and has for its object to provide simple and effective means for connecting the wheel brake actuating means to the driving mechanism of the vehicle, so that the brakes will be operated by power derived from the vehicle or motor and the braking force applied will be proportional to the speed of the vehicle. To this end the invention comprises a clutch device, one member of which is connected with the driving gear of the vehicle and is normally rotated thereby, the other clutch member being normally disengaged from the first clutch member and therefore inoperative, said second clutch member having connections with a foot lever or similar means, the operation of which will effect the engagement of the clutch members to cause both of the latter to be rotated from the driving gear of the vehicle, the second clutch member having means for connecting the same with the braking mechanism of the vehicle, so that the brakes will be applied whenever the clutch members are positively engaged.

The invention is illustrated in the accompanying drawings, in which.

Figure 3:
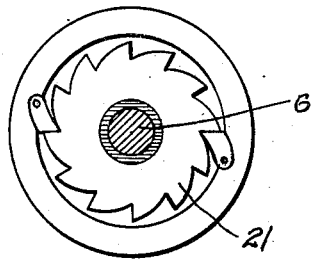
Figure 1:
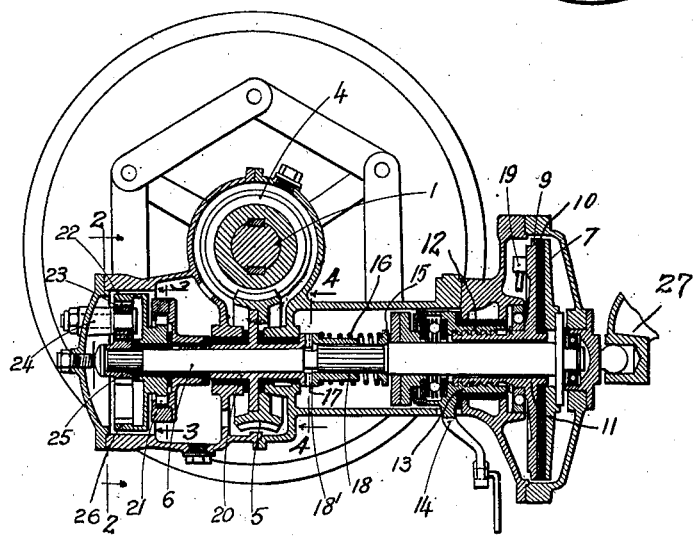
Figure 1 is a section through the device taken transversely through the propeller shaft of the automobile.
Figure 2:
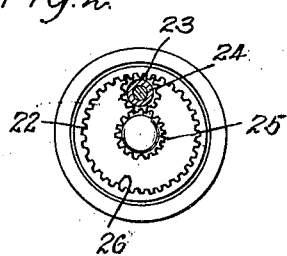
Figure 2 is an end view on the line 2—2 of Fig. 1 showing the reversing gearing.
Figure 4:
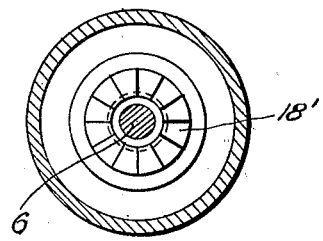

Figures 3 and 4 are sections on the lines 3—3 and 4—4 of Figure 1 showing details of the ratchet mechanism.

Referring to the drawings, 1 indicates the main or transmission shaft of the automobile vehicle to which is secured a helical gear 4 preferably at a point immediately to the rear of the gear box, which latter constitutes the actuating element of the brake applying device constituting the instant invention. Meshing with the helical gear 4, is a second helical gear 5, which is secured to a hollow shaft 20. Telescopically engaged with the hollow shaft 20 is a shaft 6, the two shaft sections 6 and 20 being journalled in a suitable casing supported on its outer end in a bracket 27 carried by the vehicle side frame, which also encloses the gear 4, and may be formed as an extension of or an attachment to the housing of the vehicle drive shaft 1. The two-part shaft formed by the sections 6 and 20 is disposed at right angles to the drive shaft 1, and mounted on the outer end of the section 6, is a friction disc member 7, rigidly secured to the shaft, said disc forming one member of a clutch. Slidably and rotatably mounted on the shaft member 6 is a co-operating clutch member 9, between the face of which and that of the member 7 is preferably located a suitable friction plate 10. The disc 9 constitutes the movable member of the friction clutch, which is normally out of engagement with its mating member 7. Formed integrally with the clutch member 9 is a collar 11, which is provided with an external screw thread 12, of relatively steep pitch, which is in engagement with an outer collar 13 provided with mating interior threads, said collar 13 being rotatable on shaft section 6, but incapable of longitudinal movement thereon. Projecting outwardly from the collar 13 is an arm 14, which is adapted to be connected by a suitable rod to the ordinary brake pedal or equivalent brake operating device, not shown. The rear face of the clutch member 9 is provided with a lug 19 which is adapted to be connected to the usual wheel brake actuating device.

The inner end of shaft section 6 is provided with longitudinal ribs or splines, which engage similar elements formed on the interior of a collar 18, which latter is movable longitudinally of the shaft, but is rotated with the latter. Said collar 18 constitutes one member of a ratchet clutch, the clutch element being formed by inclined or ratchet teeth 17 on the inner end of said sleeve 18, adapted to co-operate with corresponding ratchet teeth 18' on the adjacent edge of the hollow shaft member 20. The clutch member 18 is normally held in engagement with the corresponding clutch member on shaft section 20 by a helical spring 16, which is confined between a collar 15 on shaft section 6 and a collar on the sleeve 18. The operation of the apparatus as described is as follows:

When the shaft 1 is being rotated either by the motor of the vehicle, or by the wheels of the vehicle when the motor is unclutched, the rotary motion of said shaft is communicated to shaft section 20 by the meshing helical gears 4 and 5. When the motion of the vehicle is in the forward direction, this rotary motion of shaft section 20 is communicated to shaft section 6, by means of the ratchet clutch connecting said shaft sections, and the rotary motion of said shaft is imparted to the clutch section 7, which latter is continuously rotated so long as the vehicle is moving in a forward direction. When it is desired to apply the vehicle brakes, the sleeve 13 is given a partial turn by the operator depressing the foot pedal and thereby swinging the arm 14 which is integrally connected with the sleeve 13. Said sleeve 13 and the co-operating telescoping collar 11 constitute a screw and nut adjustment which will function to move the clutch member 9 into and out of operative engagement with the constantly rotating clutch member 7 fixed to shaft section 6. Therefore, when the arm 14 is depressed to partially rotate the outer threaded sleeve 13, the quick pitch screw threads on the interior of the sleeve 13 and the exterior of collar 11 operate to move clutch member 9 into engagement with clutch member 7, thereby causing said clutch member 9 to move in a rotary direction with said clutch member 7, so that the projecting lug 19 will exercise the necessary pull on the connecting rod to apply the wheel brakes, and it will be apparent that the force applied to operate the brakes will be directly proportional to the speed of the vehicle. When the pressure on the foot pedal is released, the parts connected therewith will be returned to normal position, by the usual spring connected with such foot pedal and the reverse movement of the sleeve 13 will retract clutch member 9 from engagement with the rotary clutch member 7.

To provide for the braking action during backward movement of the vehicle, the shaft section 6 is extended through the bore of the hollow shaft section 20 and has loosely mounted on its outer end a gear 22 provided with interior teeth 26 on its rim and a toothed pinion 25 fast on said end, the respective sets of teeth being engaged by a pinion 23 journalled on a stud 24 secured in the end of the housing. Fixed to the adjacent end of hollow shaft section 20 is one member of a ratchet clutch 21, the other member of said clutch being formed on the hub of gear member 22, the clutch being so constituted that when the vehicle is moving in a forward direction the clutch 21 is idle, but when the vehicle moves in a rearward direction and the movement of the main drive shaft 1 is reversed, the clutch 21 will be effective to rotate the gear 22 which transmits its rotary motion at multiple speed, to shaft section 6 through the intermediate pinion 23. It will thus be seen that the shaft member 6 is rotated in the same direction while the vehicle is moving either forwardly or backwardly, the forward movement of the vehicle effecting the rotation of said shaft member 6 through the ratchet clutch located at the right end of the hollow shaft section 20; on the other end the rearward movement of the vehicle will cause shaft section 6 to be rotated at increased speed by the operation of the one-way clutch 21 at the opposite end of the hollow shaft section 20, at which time the other ratchet clutch will idle. The object in using the multiple speed gearing between the shaft sections 20 and 6 during the backward movement of the vehicle is the fact that usually in backing, the main shaft 1 is driven at relatively low speed, and by multiplying the relative speed of the shaft sections 20 and 6 the operation of the brakes is accelerated. It will be understood, of course, that the actuation of sleeve 13 through lever arm 14, and the connections between the latter and the foot pedal will move clutch member 9 into engagement with the constantly rotating clutch member 7, and cause said clutch member 9 to effect partial rotation sufficient to cause the lug 19 thereof to apply the wheel brakes through connecting means between said lug and the usual brake rigging employed. The provision of the lining between the clutch members 9 and 7, permits relative movement of the clutch members without danger of breaking or impairing any of the parts, and also eliminates the noise which would result if proper means to permit the slippage between the clutch members were not provided.

What I claim is:

1. A brake actuating device for motor vehicles comprising a clutch, a two part shaft, upon one part of which one member of said clutch is fixed and the other loosely mounted, said loose clutch member having means for connecting the same with the vehicle brake operating devices, means for connecting the same to a brake pedal whereby the loose clutch member is moved into and out of engagement with the fixed clutch member, gearing connecting the other shaft part to the driving gear of the vehicle, a clutch connecting the two parts of the shaft for rotation when the vehicle is driven in a forward direction, and a second clutch having reversing gearing for connecting the shaft parts for rotation when the vehicle is driven in reverse.

2. A brake actuating device for motor vehicles comprising a friction clutch, a two-part shaft, upon one part of which one member of said friction clutch is fixed and the other member loosely mounted, said loose clutch member having means for connecting the same with the vehicle brake operating devices, means for connecting the same to a brake pedal whereby the loose clutch member is moved into and out of engagement with the fixed clutch member, gearing connecting the other shaft part to the driving gear of the vehicle, a ratchet clutch connecting the two parts of the shaft for rotation when the vehicle is driven in a forward direction, and a second ratchet clutch and reversing gearing for connecting the shaft parts for rotation when the vehicle is driven in reverse.

3. A brake actuating device for motor vehicles comprising a helical gear secured to the drive shaft of the vehicle, a shaft mounted at right angles to the drive shaft including a hollow section and a second section telescoping therewith, a helical gear fixed to the hollow section and meshing with the first mentioned helical gear, a friction disc clutch mounted on said second shaft section, one member of said clutch being fixed to said shaft section and the other member being revolubly and slidably mounted on said shaft section, means including a screw and nut device for moving the loose clutch member into and out of engagement with the fixed clutch member, a ratchet clutch operatively connecting the two shaft sections when the vehicle is driven in a forward direction, and a second ratchet clutch and reversing gearing for operatively connecting said shaft sections when the vehicle is driven in reverse.

In testimony whereof I affix my signature.

LÉON SAIVES.